United States Patent

[11] 3,616,992

[72] Inventor James S. Deacon
4492 Camellia Lane, North Olmsted, Ohio
44070
[21] Appl. No. 831,180
[22] Filed June 6, 1969
[45] Patented Nov. 2, 1971

[54] PARTIAL VACUUM CENTRIFUGAL SEPARATOR
9 Claims, 3 Drawing Figs.
[52] U.S. Cl. .................................................. 233/1 A, 233/21
[51] Int. Cl. ............................................... B01d 21/26, B01d 43/00, B01d 45/12
[50] Field of Search .......................................... 233/21, 27, 28, 19, 17, 18, 20, 16, 13, 1, 1 A

[56] References Cited
UNITED STATES PATENTS
1,469,522 10/1923 MacKaye ..................... 233/20

2,592,680 4/1952 Goodwin ..................... 233/21
2,790,598 4/1957 Beskow ....................... 233/21
3,300,129 1/1967 Brunati ........................ 233/13 X Primary Examiner—Jordan Franklin
Assistant Examiner—George H. Krizmanich
Attorney—Bosworth, Sessions, Herrstrom & Cain ABSTRACT: A centrifugal separator is provided for removing solid particles entrained in a liquid slurry. A column of liquid is maintained in a rotating open bottom drum by vacuum pressure and the lower end of the drum is received in a shallow basin of a coaxially rotating table. Entrained solid particles are moved by centrifugal action to an annular zone adjacent the wall of the drum where they gravitate and concentrate in a perimetric zone of the shallow basin outside of the drum wall, and are then removed in the form of sludge. Clarified liquid is removed from the top of the central core zone of the liquid in the drum.

INVENTOR.
JAMES S. DEACON
BY Bosworth, Sessions, Herrstrom & Cain
ATTORNEYS

PARTIAL VACUUM CENTRIFUGAL SEPARATOR

BACKGROUND OF THE INVENTION

This invention relates to the removal of solid particles entrained in a liquid slurry, such as water-containing solid particles from a wet-type dust collection apparatus for example. Dust collection systems are frequently used in industrial facilities such as foundries and are becoming increasingly important in the field of air pollution control.

More particularly, the invention relates to a centrifugal separator for concentrating the solid impurities entrained in a liquid slurry and thence drawing off the material containing the concentrated solid particles in the form of a sludge to clarify (i.e. clean) the liquid and thus enable most of the liquid (e.g. 90 percent) to be recirculated to the respective system for reuse.

One type of dust collector used to reduce air pollution in various industries is a wet-type dust scrubber. These devices receive dust or particle laden air or other gas and direct it through a tortuous path wherein it passes through sprays or curtains of water. The water picks up solid particles or dust and holds it in suspension or entrainment until the water is removed from the unit. One particularly effective unit of this type is shown in U.S. Pat. No. 3,289,398 of Robert L. McIlvaine, assigned to National Dust Collector Corporation of Chicago, Ill.

Where these units have been used, however, some means must be provided for removing the solids from the water or clarifying it. In the past, large settling basins or sediment beds have been used sometimes covering several acres. In time the solids settle out and the clear water can be reused, however, the space required is costly and the system is inefficient. Also small sludge tanks with a retention time of 10 minutes or less have been used but they generally do a poor job of clarifying the water. These tanks normally use a continuous conveyor that travels through the tank and scrapes the settled material or sludge from the bottom.

The apparatus of the present invention, however, satisfies the long felt need for improved separation of solid particles from particle-laden scrubbing water and affords other features and advantages heretofore not obtainable in the art.

SUMMARY OF THE INVENTION

It is among the objects of the invention to clarify water containing entrained solid particles so that the water is sufficiently clear to permit reuse.

Another object of the invention is to concentrate solid particles entrained in a liquid slurry so that the particles may be removed in the form of a sludge and the clarified water circulated for reuse.

Another object is to provide improved separation efficiency in the removal of solid particles entrained in water used in connection with dust-collecting systems.

Still another object is to provide a quick and efficient means for clarifying particle laden water from a dust collecting system so that up to 90 percent of the particle laden water may be circulated for reuse.

These and other objects are achieved by means of a centrifugal separator comprising a horizontal table rotatable about a central vertical axis and defining a shallow basin having a floor and a continuous perimetric sidewall. A drum is mounted coaxially with the table for rotation therewith, the drum being perimetrically sealed at its upper end and having an open lower end located within the basin and spaced slightly above the floor thereof. The drum and the sidewall of the table form an annular open trough. A liquid slurry containing entrained solid particles is supplied to the drum and a means is provided for creating a vacuum in the drum to maintain a column of water therein at a level substantially above the level of liquid in the annular trough. The table and drum are rotated to impart an angular velocity to the slurry whereby solid particles are propelled by centrifugal force to an annular zone adjacent the wall of the drum and then gravitate therefrom to the annular trough to clarify the water in the central core zone of the drum. The clarified water is then removed from the central zone of the drum and the concentrated solid particles are removed in the form of sludge from the trough.

DESCRIPTION OF THE PREFERRED EMBODIMENT

Figure 1:
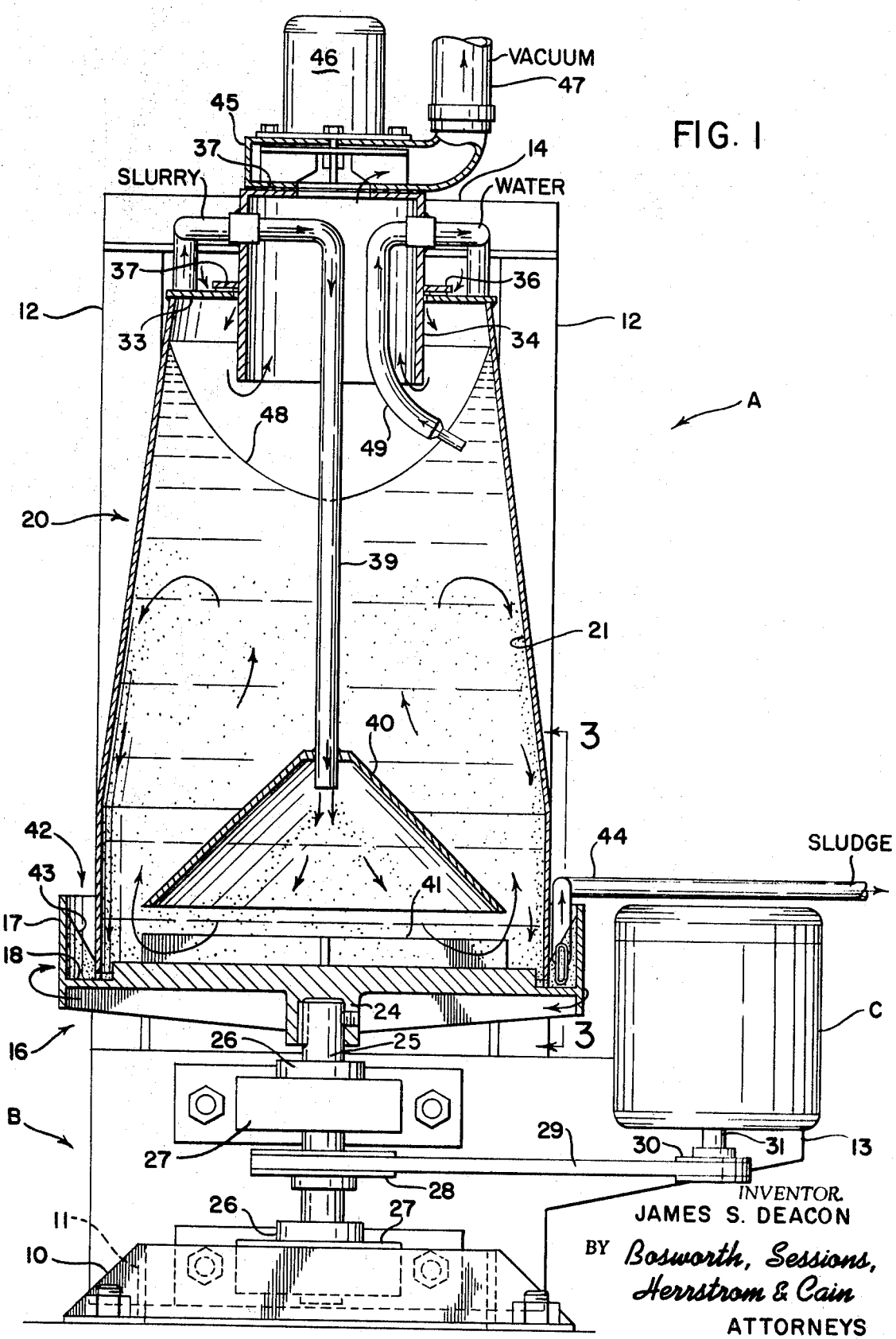
FIG. 1 is a vertical section through a centrifugal separating unit embodying the invention.

Referring more particularly to the drawings there is shown a centrifugal separator unit A embodying the invention and adapted to remove solid particles entrained in a liquid slurry, the unit being mounted on a frame B and driven about a central vertical axis of rotation by an electric motor C. The frame B comprises a pair of spaced sole plates 10 connected by two parallel crossmembers 11. A pair of vertical posts 12 in the form of angle bars are welded to the crossmembers 11 and rigidly braced by diagonal members (not shown). The posts 12 support a vertical mounting plate 13 at their lower ends and an upper cross brace 14. The vertical mounting plate 13 has a bracket 15 which supports the drive motor C which is mounted with its drive shaft vertical and parallel to the axis of rotation of the separator unit A.

The separator unit A comprises a rotating table 16 with a circular perimetric sidewall 17 and a floor 18 that define a shallow basin. Received within the shallow basin is the open lower end of a rotating vertical drum 20 having a generally cylindrical sidewall 21 with the upper portion thereof having a tapering frustoconical form.

The rotating table 16 is supported by and keyed as shown at 24 to a vertical shaft 25. The shaft 25 has spaced bearing flanges 26 that bear against spaced bearing blocks 27 in which the shaft 25 is journaled. The shaft has a pulley 28 located between the bearing blocks 27 and driven by a V belt 29 which in turn is driven by a drive pulley 30 mounted on the output shaft 31 of the motor C. The drum 20 has its lower end spaced from the floor 18 of the rotating table 16 by spacers 32 which also serve to secure the drum to the table 16 for rotation therewith.

Located at the top of the drum 20 and welded to the upper end of the sidewall 21 is an annular top plate 33. The top plate receives in its central opening, a stationary suction tube 34 which extends into the interior of the drum 20 and substantially below the top plate 33 as best shown in FIG. 1.

Figure 2:
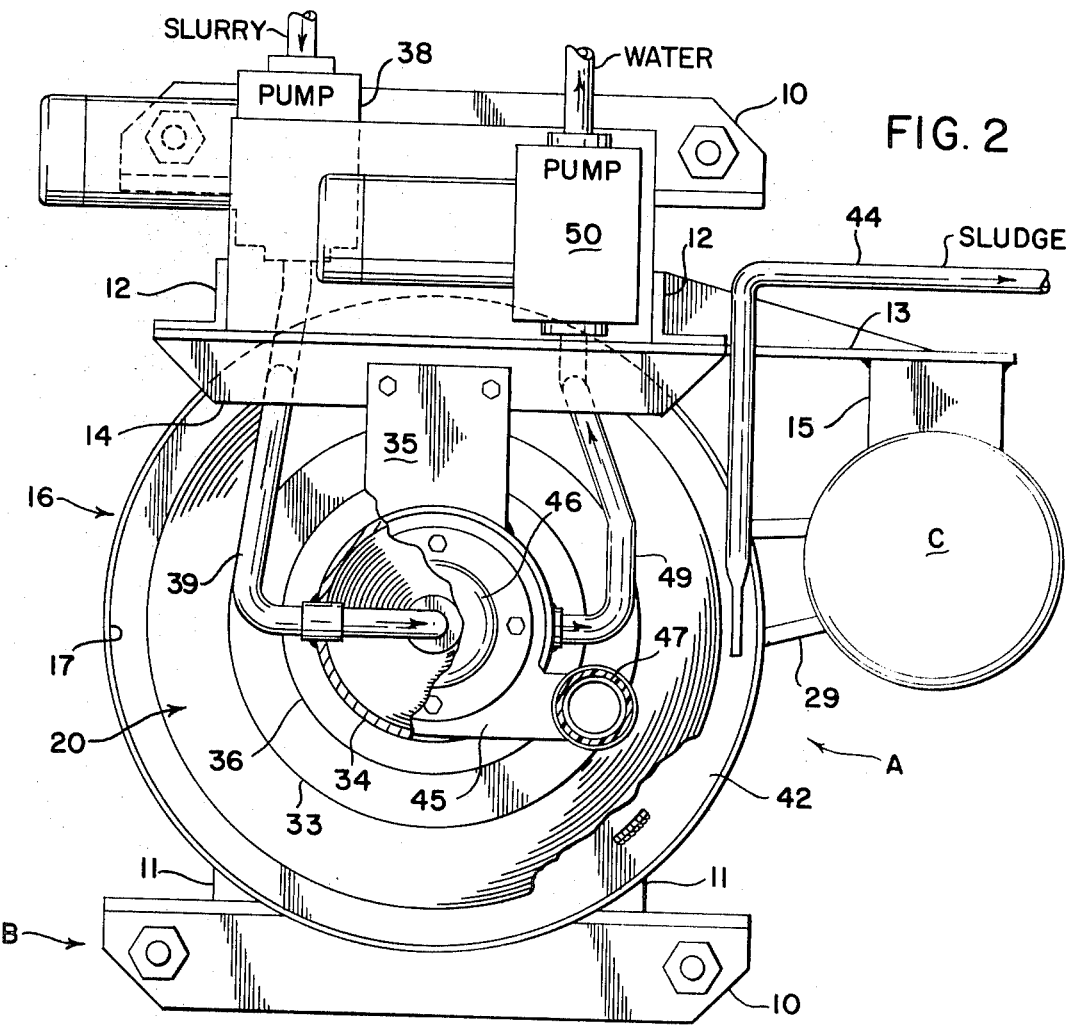
FIG. 2 is a plan view of the separating unit of FIG. 1 with parts broken away and shown in section for the purpose of illustration.

The suction tube 34 is securely mounted to the upper portion of the frame B by means of a mounting bracket 35 bolted to the cross brace 14 (FIG. 2). The tube 34 has an annular outer flange 36 spaced slightly above the annular top plate 33 and an air seal ring 37 located between the flange 36 and the top plate 33, provides a rotary air seal between the rotating drum 20 and the suction tube 34.

Figure 3:
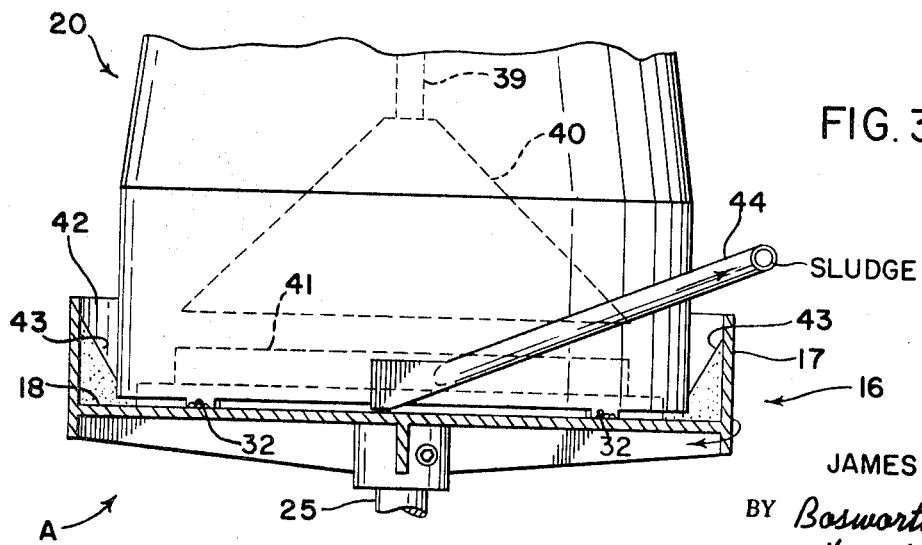
FIG. 3 is a fragmentary sectional view taken on the line 3—3 of FIG. 1.

The liquid slurry containing entrained solid particles to be separated or removed therefrom is pumped into the drum 20 by a slurry pump 38 through an inlet pipe 39 which extends through the sidewall of the stationary suction tube 35 (Figures 1 and 2) and then axially downward at the center of the drum 20, to the lower end thereof. A distributor cone 40 is welded to the bottom of the inlet pipe 39 and serves to direct the flow of water downwardly and outwardly toward the sidewall 21 of the drum 20 at the lower end thereof. The rotation of the drum and table causes a corresponding angular velocity or swirl for the slurry and a turbulence dampener 41 in the form of horizontal radial vanes, is mounted on the floor 18 of the table 16 to aid in imparting the angular velocity with a minimum of turbulence. The vertical perimetric side wall 17 of the rotating table 16 and the lower end of the coaxial sidewall 21 of the drum 20 define an annular trough 42 in which solid particles concentrate in the form of a sludge due to a combination of centrifugal action and gravitation. The sludge indicated by the numeral 43 (Figure 3) enters the trough 42 through the space between the floor 18 of the table 16 and the lower edge of the sidewall 21 of the drum 20. The sludge 43 is pumped out of the trough 42 through a sludge pipe 44.

TA column of water is maintained within the drum 20 by means of a vacuum within the drum which is created by a centrifugal vacuum pump 45 mounted on top of the suction tube 35 and driven by a motor 46. Evacuated air exits through a pump outlet pipe 47.

As indicated above, the vacuum pump 45 serves to maintain a vacuum within the drum 20 so as to maintain a column of water within the drum by virtue of atmospheric pressure acting on the surface of the sludge 43 in the annular trough 42. Also, since the water in the drum is given an angular velocity the resulting centrifugal action causes a vortex within the drum which, is illustrated by the vortex line 48 as viewed in vertical section (Figure 1).

The amount of vacuum pressure and the speed of rotation of the table 16 and drum 20 should be adjusted so that the highest water level which occurs adjacent the wall 21 of the drum 20 will not reach the top plate 33 and also so that the lowest level which occurs at the central vertical axis of the drum 20 will not drop excessively low. In view of the centrifugal action as well as the gravitational action acting on the solid particles entrained in the entering slurry, the water, by the time it has risen from the lower edge of the distributor 42 to approximately the vortex line 48, will be substantially clarified. This clarified water is extracted through a clear water extraction pipe 49 by means of an extraction pump 50 (FIG. 2). If the situation permits, a siphon action may be used alternatively for removing the clarified water.

OPERATION

The operation of the separator unit A requires careful establishment of the desired conditions essential to the formation of the liquid column within the drum 20. This is accomplished by first filling the shallow basin of the table 16 with the slurry until it approaches the top of the trough 42, by using the slurry pump 38. When the desired level is reached, the vacuum pump motor 46 is started to drive the centrifugal vacuum pump 45. This raises the water level within the drum 20 and drops the water level or the slurry liquid level in the trough 42 until the seal is no longer maintained at the bottom of the drum and some air is permitted to bubble in. As additional slurry is pumped through the inlet pipe 39, however, the liquid level within the drum 20 continues to rise until an adequate liquid seal is maintained between the trough 42 and the drum wall 21.

When the liquid level in the trough 42 is closely spaced from the top of the sidewall 17 the pump 38 is preferably stopped. As this condition occurs the drive motor C is started and the speed is slowly increased until the desired vortex is established within the drum 20. Some of the slurry may escape from the trough 42 but this will cease when the condition stabilizes and the surface of the liquid takes the form shown in Figures 1 and 3.

When these conditions are established, solid particles will be driven by centrifugal action to an annular zone adjacent the wall 21 of the drum 20 and thence will gravitate to the floor of the table 16, pass radially through the space between the wall 21 of the drum 20 and the floor 18 of the table and concentrate in the form of sludge in the trough 42. Finally the inlet pump 38 and the clear water extraction pump 50 are started simultaneously and adjusted to maintain a proper balance between the supply of slurry to the drum and the extraction of clear water in such a way as to maintain the desired liquid level within the drum. If the sludge pump (not shown) is used it should be started along with the clear water extraction pump 50 and also adjusted to a speed corresponding to the accumulation of relatively concentrated sludge in the trough 42.

It will be seen that the invention utilizes centrifugal force as well as gravitational force to provide an efficient and effective extraction of solid particles from the liquid and the separator A is thus able to return a substantial portion of the liquid medium to the associated equipment for reuse. Also the separation is accomplished very quickly so as to reduce the volume of water required for the associated equipment and provide a concentrated sludge which may be easily handled and disposed of.

In many applications it will be most convenient to deliver the sludge (which typically contains about 10 percent of the water received by the separator) to a small sludge tank of, for example, a 10,000 gallon capacity, with a continuous conveyor that removes settled solid from the bottom of the tank. Then some of the additional 10 percent of the total water flow may also be recirculated to the dust collector system.

While the invention has been shown and described with respect to a specific embodiment thereof this is intended for the purpose of illustration rather than limitation, and other variations and modifications will be apparent to those skilled in the art without departing from the spirit of the invention. Accordingly, the patent is not to be limited in scope and effect to the specific embodiment shown herein, nor in any way that is inconsistent with the extent to which the progress in the art has been advanced by the invention.

I claim:

1. Apparatus for separating solid particles entrained in a liquid slurry comprising a horizontal table rotatable about a central vertical axis, said table defining a shallow basin having a floor and a perimetric sidewall, a drum mounted coaxially with said table for rotation therewith and having an open lower end located within said basin, said drum and said sidewall forming an annular trough communicating with the interior of said drum, means for supplying said liquid slurry to said drum, means for maintaining a column of liquid in said drum at a level substantially above the liquid level in said annular trough, means for rotating said table and said drum to impart an angular velocity to said slurry whereby solid particles are propelled by centrifugal force to an annular zone adjacent the wall of said drum and thence to said trough to clarify the liquid in the central zone of said drum, means for removing clarified liquid from said drum, and means for removing material containing a high concentration of solid particles from said trough.

2. Apparatus as defined in claim 1 wherein the upper portion of said drum has a frustoconical form tapering inwardly toward the top.

3. Apparatus as defined in claim 1 wherein said means for supplying said liquid slurry to said drum comprises a stationary pipe extending downwardly coaxial with the axis of said drum.

4. Apparatus as defined in claim 3 including a conical distributor secured to the lower end of said pipe and adapted to direct the liquid slurry from said pipe downwardly and radially outwardly toward the lower portion of the wall of said drum.

5. Apparatus as defined in claim 1 wherein the upper end of said drum has a central stationary member and a rotary seal between said member and said drum to provide a hermetic seal.

6. Apparatus as defined in claim 5 wherein said means for maintaining a column of liquid in said drum comprises a vacuum pump operatively associated with said stationary member.

7. Apparatus as defined in claim 5 wherein said means for supplying liquid slurry and said means for removing clarified liquid extend through said stationary member.

8. A process for separating solid particles entrained in a liquid slurry comprising rotating a drum containing said slurry about a vertical axis to impart an angular velocity to the slurry and propel solid particles by centrifugal force to an annular zone adjacent a wall of said drum and thereby clarify the liquid in a central zone of said drum, permitting radial outward movement of said slurry adjacent the base of the drum into a relatively shallow area disposed about said base of the drum, forming a partial vacuum in the drum to maintain the level of the slurry within the drum above the level of the slurry in said shallow area, removing particle-free liquid from an upper portion of said elevated slurry within the drum, and removing liquid containing a high concentration of said particles from the relatively shallow area.

9. The process of claim 8 including continuously supplying liquid slurry to said drum.